United States Patent [19]

Sasaki et al.

[11] Patent Number: 4,960,092
[45] Date of Patent: Oct. 2, 1990

[54] ENGINE CONTROL SYSTEM

[75] Inventors: Shoji Sasaki; Kenji Tabuchi, both of Katsuta, Japan

[73] Assignees: Hitachi, Ltd., Tokyo; Hitachi Automotive Engineering Co., Ltd., Ibaraki, both of Japan

[21] Appl. No.: 426,058

[22] Filed: Oct. 24, 1989

[30] Foreign Application Priority Data

Nov. 2, 1988 [JP] Japan ................... 63-276259

[51] Int. Cl.⁵ .................. F02D 45/00; F02D 11/00
[52] U.S. Cl. ...................... 123/414; 123/479; 123/643; 364/431.11
[58] Field of Search ............... 123/414, 417, 479, 630, 123/643; 364/431.11

[56] References Cited

U.S. PATENT DOCUMENTS

| | | | |
|---|---|---|---|
| 4,485,784 | 12/1984 | Fujii et al. | 123/643 |
| 4,494,518 | 1/1985 | Katayama et al. | 123/414 |
| 4,644,917 | 2/1987 | Yakuwa et al. | 123/414 |
| 4,658,786 | 4/1987 | Foss et al. | 123/414 |
| 4,664,082 | 5/1987 | Suzuki | 123/414 |
| 4,690,123 | 9/1987 | Kimura et al. | 123/414 |
| 4,718,395 | 1/1988 | Iwata | 123/414 |
| 4,788,956 | 12/1988 | Suzuki et al. | 123/414 |

FOREIGN PATENT DOCUMENTS 62-225770 10/1987 Japan .

Primary Examiner—Tony M. Argenbright
Assistant Examiner—Robert E. Mates
Attorney, Agent, or Firm—Antonelli, Terry, Stout & Kraus

[57] ABSTRACT

An engine control system comprises a crank angle sensor for generating reference signals, each outputted at a first predetermined rotational angle interval of the engine and position signals for controlling the ignition timing, an angle ignition signal generator for generating an angle ignition signal on the basis of the reference signal and the position signal, a clock signal generator for generating clock signals with a constant time period, a time ignition signal generator for generating a time ignition signal on the basis of the reference signal and the clock signal, abnormality detector for detecting abnormality in the position signals and outputting selecting means for selecting to output the angle ignition signals in a normal state and the time ignition signals when the abnormality in the position signals is detected, whereby the ignition timing is controlled in both normal and abnormal states of the position signal.

8 Claims, 8 Drawing Sheets

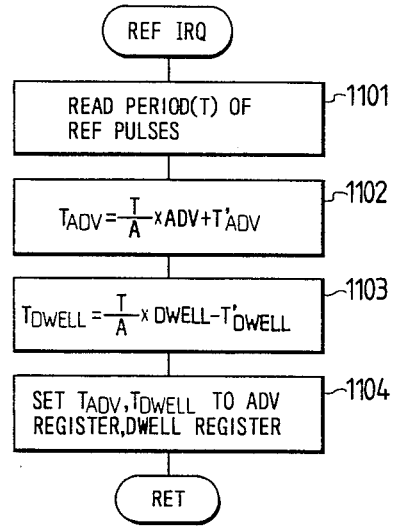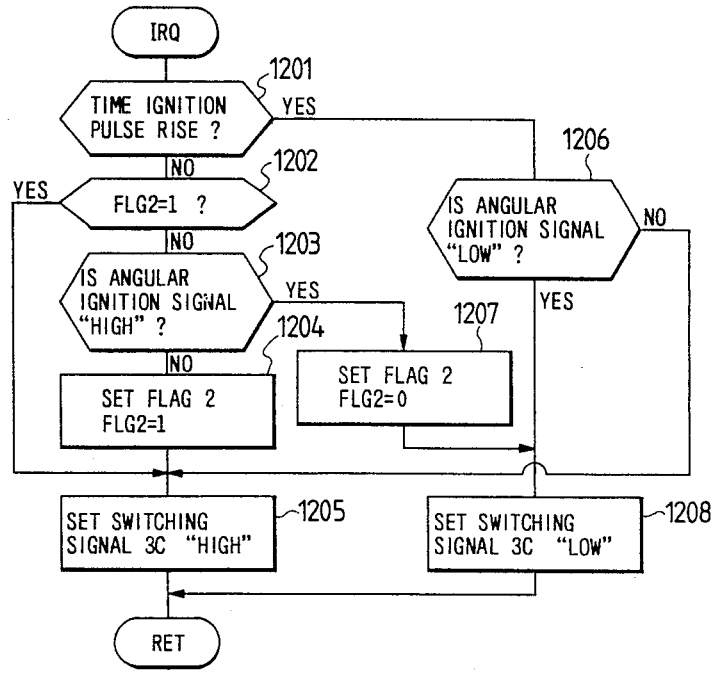

ENGINE CONTROL SYSTEM

BACKGROUND OF THE INVENTION

The present invention relates to an engine control system and, more particularly, to an engine control system suited for backup when an crank angle sensor becomes abnormal.

As a backup method for an ignition control when a crank angle sensor is abnormal, a conventional engine control is accomplished by providing not only a crank angle sensor for normal control but also a backup crank angle sensor so that the output of the backup crank angle sensor is switched to calculate the ignition timing when an abnormality of the normal crank angle sensor is detected, as disclosed in Japanese Patent Laid-Open No. 62-225770. The ignition timing control as mentioned above, however, is not properly accomplished when the normal crank angle sensor is switched to the backup crank angle sensor when in an abnormal operation. As a result, the normal ignition timing signal cannot be outputted at an abrupt interruption when a position signal outputted from the crank angle sensor becomes deficient but is instantly retrieved. Thus, rotational fluctuations are caused to invite an engine stall in the worst case.

SUMMARY OF THE INVENTION

An object of the present invention is to provide an engine control system which is free from rotational fluctuations or stall of the engine due to instant deficiency of position signals (POS signals) of a crank angle sensor which are one of the data necessary for an ignition timing control.

The present invention resides in an engine control system in which ignition timing control is effected on the basis of angle ignition signals, the system comprising reference signal generating means for generating reference signals each outputted at each first predetermined rotational angle interval of the engine, the reference signals each having a constant angular relation to a top dead center of each cylinder of the engine, position signal generating means for generating position signals for control the ignition timing, the position signals each having a second predetermined rotational angle interval shorter than the first predetermined rotational angle interval, angle ignition signal generating means for generating an angle ignition signal on the basis of the reference signal and the position signal, clock signal generating means for generating clock signals with a constant time period, time ignition signal generating means for generating a time ignition signal on the basis of the reference signal and the clock signal, abnormality detecting an means for detecting abnormality in the position signals and output selecting means for selectively outputting the angle ignition signals in a normal state and the time ignition signals when the abnormality in the position signals is detected, whereby the ignition timing is controlled in both normal and abnormal states of the position signal.

According to the above-specified structure, the ignition timing control is accomplished on the basis of the REF signal and the position (POS) signal when in a normal state and on the basis of the reference (REF) signal and the clock signal when the POS signal generation becomes abnormal.

As a result, engine control can be properly accomplished even when the POS signal is abruptly deficient.

BRIEF DESCRIPTION OF THE DRAWINGS

FIGS. 11 and 12 are flow carts of the second embodiment; and

DESCRIPTION OF THE EMBODIMENTS OF THE INVENTION

An embodiment of the present invention will be described hereunder with reference to the accompanying drawings.

Figure 1:
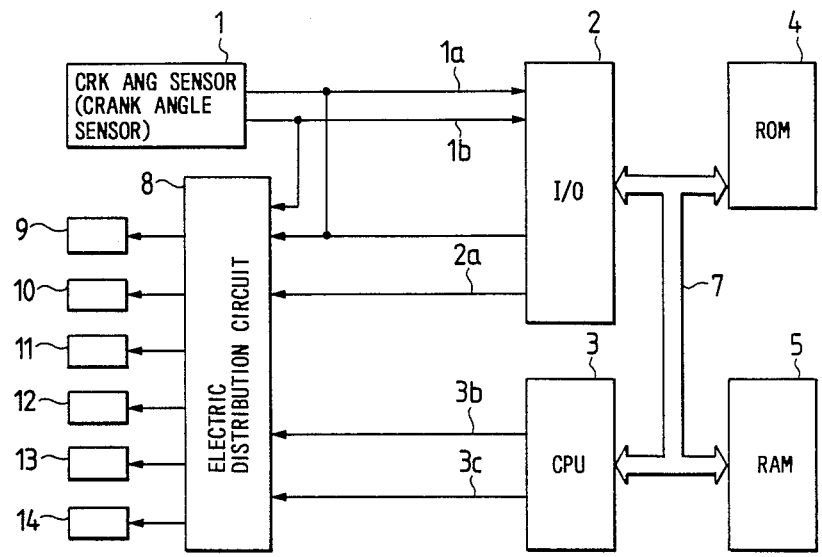
FIG. 1 is a block diagram showing an embodiment (first embodiment) of an engine control system according to the present invention.

FIG. 1 is a diagram showing an engine control system according to the present invention.

In FIG. 1, a crank angle sensor 1 generates signals when an engine crankshaft comes to a predetermined rotational angle. That is, the crank angle sensor 1 generates both a reference position signal (i.e., REF signal) 1a of the number of the engine cylinders at an equal interval (of 120 degrees for a six-cylinder internal combustion engine) during two turns of the crankshaft and a position signal (i.e., POS signal) 1b at each minute angle (e.g., 2 degrees) of rotation of the crankshaft. The REF signal is generated at a relative angular position advanced by 70° from a top dead center of a piston, for example. Signals for ignition timing control are generated on a basis of the REF signal.

These REF and POS signals are fed through an input-/output interface (I/O) 2 to a central processing unit (CPU) 3. This CPU 3 accomplishes its processing operations on the basis of the program and fixed data which are stored in a read only memory (ROM) 4. Incidentally, temporary data being processed by the CPU 3 is latched by a random access memory (RAM) 5. The processed data is fed as an angle ignition signal 2a through the I/0 2 to an electronic distribution circuit 8 to control ignition coils 9 to 14.

Figure 2:
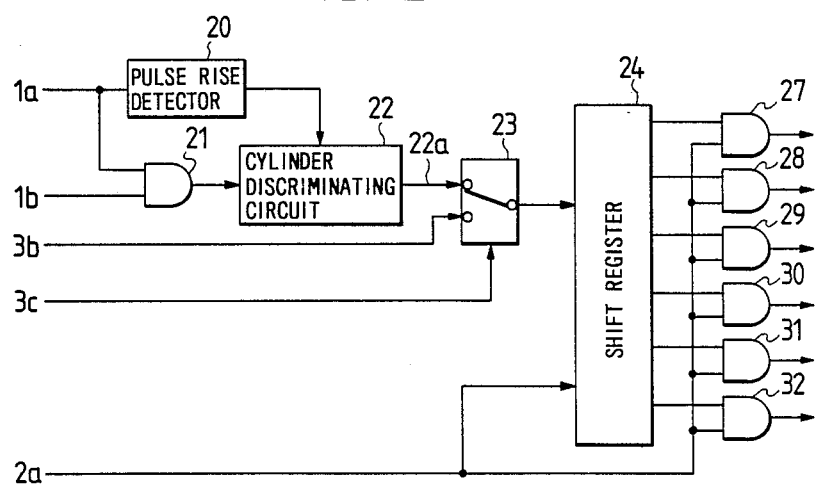
FIG. 2 is a block diagram showing the internal structure of the electronic distribution circuit of FIG. 1.

FIG. 2 is a diagram showing the internal structure of the electronic distribution circuit 8.

The REF signal 1a and the POS signal 1b detected by the crank angle sensor 1 are logically operated on by an AND gate 21 and inputted to a cylinder discriminating circuit 22, wherein each of the cylinders is discriminated from the others. The REF signal 1a has its pulse width made different for the individual cylinders. For example, the REF signal indicating the first cylinder has a pulse width of 24 shots of POS signal, the REF signal indicating the second cylinder has a pulse width of 20 shots of POS signal, the REF signal indicating the third cylinder has a pulse width of 16 shots of POS signal, the REF signal indicating the fourth cylinder has a pulse width of 12 shots of POS signal, the REF signal indicating the fifth cylinder has a pulse width of 8 shots of POS signal, and the REF signal indicating the sixth cylinder has a pulse width of 4 shots of POS signal. Namely, the REF signals each are the same in pulse interval between one of the REF signals and another adjacent to the REF signal and different in pulse width.

The REF signal 1a and the POS signal 1b are fed to the AND gate 21, the AND gate 21 outputs an output having the number of pulses corresponding to the pulse width of the REF signal. The cylinder discriminating circuit 22 decides the cylinder to output a reference cylinder signal 22a by counting the pulse number with its counter. Incidentally, the counted value is cleared by detecting the rise of the REF signal with a pulse rise detection circuit 20. A shift register 24 shifts an angle, ignition signal 2a to each cylinder in response to the reference cylinder signal 22a. Moreover, the angle ignition signal 2a is added to AND gates 27 to 32 so that it is outputted to a cylinder to be ignited in accordance with the output of the shift register 24 through the corresponding ignition coil 9 to 14.

Figure 3:
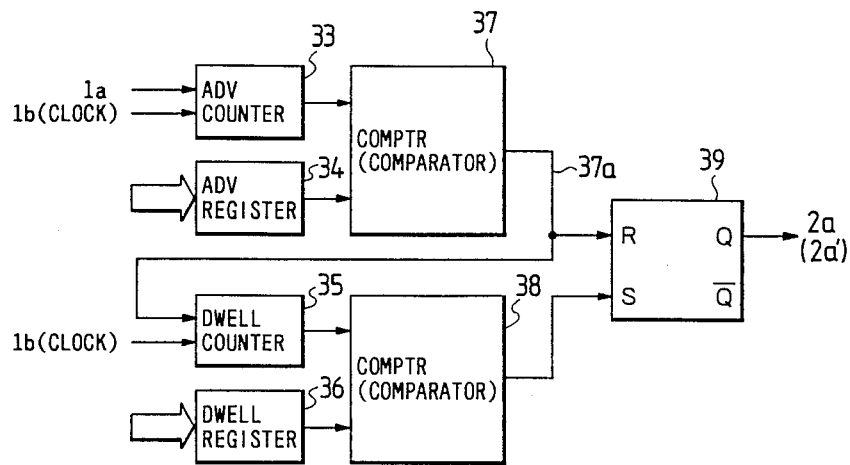
FIG. 3 is a block diagram showing the internal structure of the I/0 of FIG. 1.

FIG. 3 is a diagram showing the internal structure of the I/0 2. This I/0 2 comprises an ADV counter 33 for inputting and counting the pulses, an ADV register 34 for storing the value of advance angle, a comparator 37, a DWELL counter 35 for inputting and counting the pulses, a DWELL register 36 for storing a non-power supply angle DWELL, a comparator 38, and a flip-flop (FF) 39.

The operations of the I/0 2 will be described with reference to the timing chart shown in FIG. 4. The CPU 3 calculates the engine speed from the output of the crank angle sensor 1 and receives signals indicating the engine states from sensors (not shown) to store the advance angle value ADV and the non-power supply angle DWELL in the ADV register 34 and the DWELL register 36.

Figure 4:
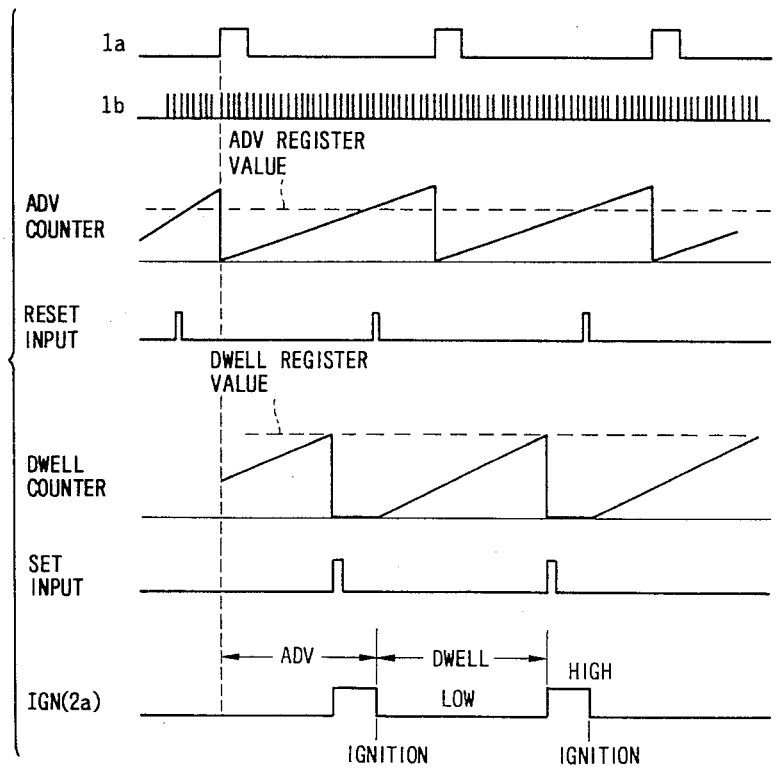
FIG. 4 is a timing chart showing the operations of the I/0.

The ADV is an angle from pulse rise of the REF signal to the ignition position, as shown in FIG. 4, and the DWELL is an angle from the ignition position to a next starting of power supply to the ignition coil and power supply to the ignition coil is not effected during the DWELL as shown in FIG. 4.

The ADV counter 33 inputs REF signal 1a and POS signal 1b, starts to count the POS signal from a pulse signal 1b, starts to count the POS signal from a pulse rise of the REF signal 1a, and is reset by a pulse rise of the next REF signal. While the ADV counter 33 is counting, the counter value is sent to the comparator 37 and compared with a register value of ADV. When the counter value reaches the register value, the comparator 37 generates a signal 37a and sends it to the reset input of the flip-flop 39 thereby to switch the flip-flop to a low level.

On the other hand, the DWELL counter 35 count up the POS signals 1b when fed with the signal 37a from the comparator 37. When the DWELL register value and the DWELL counter value are coincident, a pulse signal is fed from the DWELL comparator 38 to the set input of the flip-flop FF 39 to raise the FF 39 to a high state. Incidentally, the DWELL counter 35 is cleared with the pulse signal of the DWELL comparator 38. Moreover, when the ADV counter 33 counts up until the ADV register value and the ADV counter value are coincident, the pulse signal 37a is added from the ADV comparator 37 to the reset input of the flip-flop 39 to drop the flip-flop 39 to a low level as mentioned above. Thus, the ADV counter 33 is reset and counted up in response to the REF signal 1a, and the DWELL counter 35 is counted up in response to the pulse output 37a of the ADV comparator 37, whereby an angle ignition signal 2a is outputted from the flip-flop 39 as shown in FIG. 4 as IGN (2a).

The I/0 2 normally operates on the basis of the REF signal 1a and the POS signal 1b to generate the angle ignition signals 2a as mentioned above but fails to accomplish its normal operations in case the POS signal 1b is made deficient by some cause. This operation will be described with reference to FIG. 5.

Figure 5:
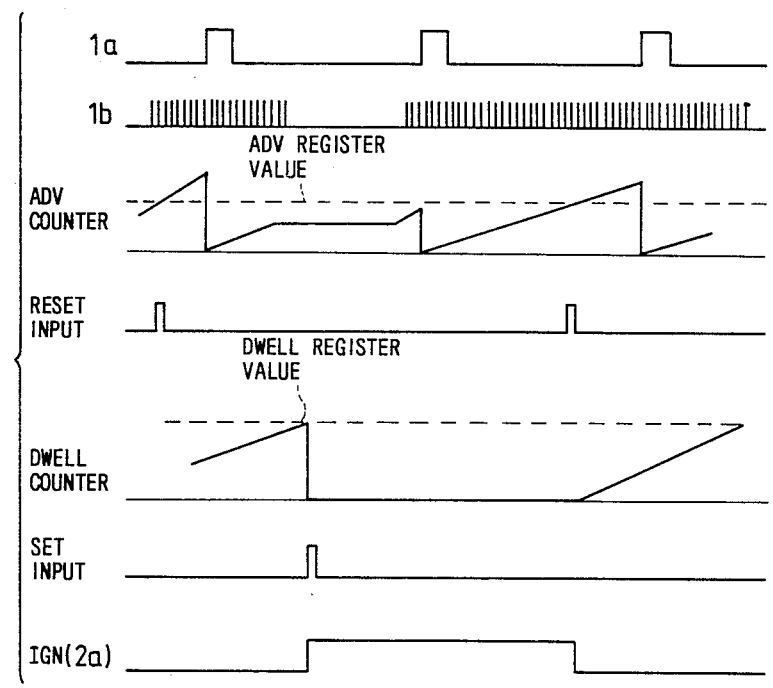
FIG. 5 is a timing chart showing the operations of the I/0 when the POS signals are deficient.

The ADV counter 33 shown in FIG. 3 is reset in response to the REF signal 1a to count up POS signals 1b. If the POS signal 1b is deficient as shown in FIG. 5, a REF signal 1a which is to be generated next to the REF signal 1a which has reset the ADV counter is generated before the ADV counter value reaches the ADV register value, and the ADV counter is reset with the last-mentioned REF signal to count up again from the reset state. As a result, a pulse signal is not generated between the above-mentioned two REF signals so that the flip-flop can not be made low and the angle ignition signal 2a is made as shown in FIG. 5, whereby ignition is not effected. In case the POS signal 1b is not deficient after the generation of the REF signal 1a, the ADV counter counts up the POS signal 1b to reach the ADV register value so that the signal is impressed to the reset input of the flip-flop to generate a spark from the ignition coil. Thus, in case the POS signal is deficient, the cylinder to be ignited may possibly fail to be ignited.

Figure 6:
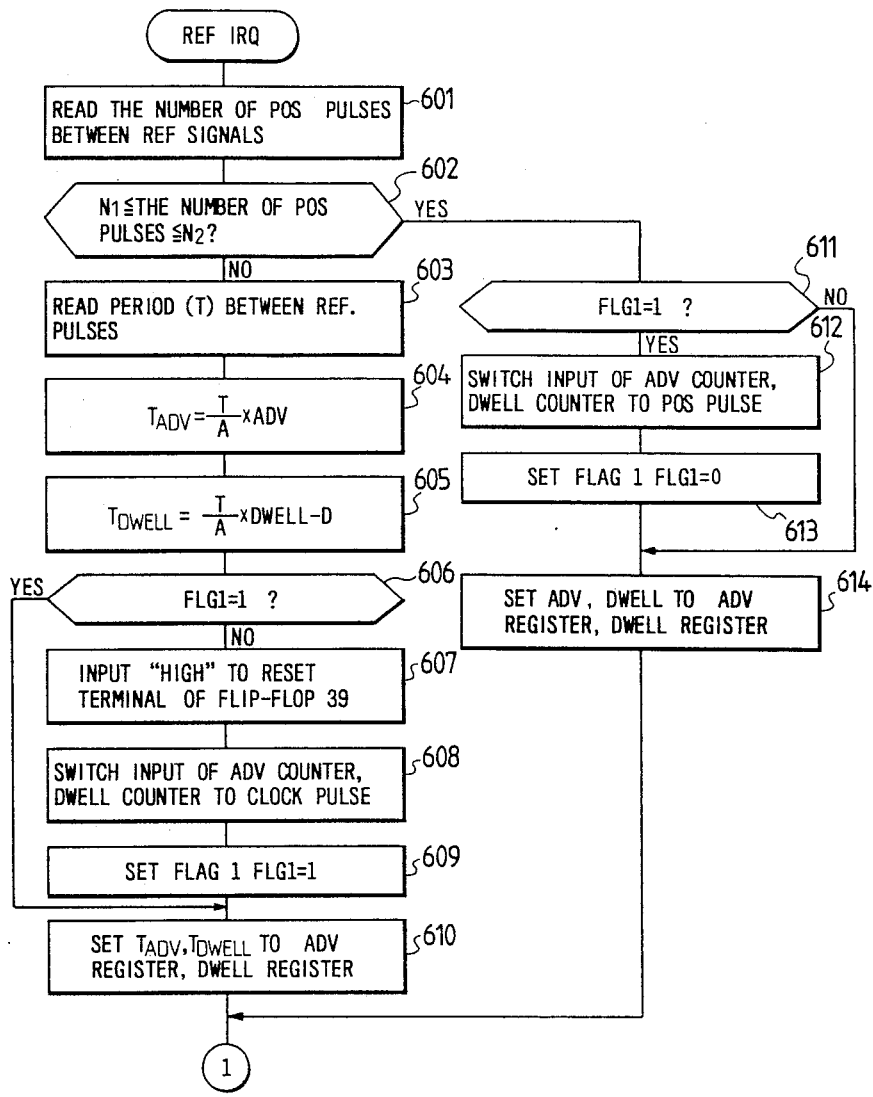
FIG. 6 is a flow chart for the backup of the ignition signals.

Next, the backup of the deficiency of the POS signal 1b of one embodiment of the present invention will be described with reference to the flow chart of FIG. 6.

When an interruption signal REFIRQ is generated in response to the REF signal, the CPU starts to operate according to the present flow chart.

At step 601, the number of POS signals 1b between the REF signals 1a is read out. The count of the POS signals 1b can be achieved by clearing the counter with the preceding REF signal, for example, and by counting POS signals. A constant number of POS signals 1b are always generated between the REF signals 1a. If, for example, the REF signal 1a is generated at every 120 degrees whereas the POS signals 1b are generated at every 2 degrees, sixty POS signals 1b should be generated between the REF signals 1a.

If, however, the POS signals 1b are partially deficient, the number of the POS signals 1b is not the predetermined value so that it is possible to decide that the crank angle sensor 1 is abnormal. The abnormality is decided at Step 602, depending upon whether or not the number of the POS signals 1b is within a predetermined range, that is, the following relation is satisfied:

$N_1 \leq \text{POS signal numbers} \leq N_2$ wherein $N_1$, $N_2$ each are predetermined number. In case it is decided that the crank angle sensor 1 is not abnormal, the routine advances to Step 611, wherein it is decided by flag 1 whether or not any abnormality in the POS signal 1b takes place at the previous step. If it is decided that the POS signal 1b is not abnormal, that is, flag 1 indicates not 1 but 0, the ignition timing is controlled using a usual angle ignition signal 2a. In case the POS signal was abnormal in the previous step, the inputs of the ADV counter 33 and the DWELL counter 35 are changed to POS pulse from clock pulse at Step 612, the flag 1 is set to 0, the ADV and the DWELL are set to the ADV register 34 and DWELL register 36, respectively at Step 614, and then the ignition timing is controlled by the usual angle ignition signal 2a.

However, even in case it is decided at the Step 602 that the crank angle sensor 1 is abnormal, when only the POS signals 1b are deficient but the REF signals 1a are normally generated, the ignition signal can be controlled on the basis of the period of the REF signals 1a. In other words, a time ignition signal for controlling ignition timing is generated, based on the REF signal 1a and clock pulse to use it for the angle ignition signal 2a.

Figure 7:
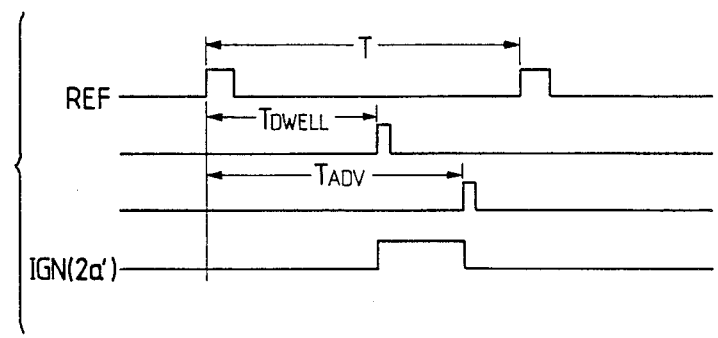
FIG. 7 is a timing chart showing the operations of backup ignition signal generations.

At Step 603, the period T of the REF signals 1a as shown in FIG. 7 is read in. At Step 604, the advance angle value ADV is converted from the angle value to a time value $T_{ADV}$ according to the following equation:

$$T_{ADV} = T/A \times ADV$$

wherein A is a constant, which is determined by a crank angle valve between the REF signals 1a, for example, the angle is 120° when a six cylinder engine is used, that is, the constant is 120.

Incidentally, the ADV counter 33 is reset in response to the REF signals, and the $T_{ADV}$ designate a time period from the generation of the REF signal to the ignition by the ignition coil. At Step 605, the non-power supply angle DWELL is converted to a time period. Incidentally, this flow chart is started with the REF signal, and a time period $T_{DWELL}$ has to be that from the generation of the REF signal, so that it is calculated by subtracting a constant value D from the value $T_{DWELL}$. This value $T_{DWELL}$ to be used may be merely a fixed value. At Step 606, it is decided whether or not the flag 1 indicates 1 which means that the POS signals 1b were deficient at previous step. In case the deficiency of the POS signals 1b also occurred at the preceding start (when flag 1=1), the control with the time ignition signal is subsequently accomplished. The routine advances to the Step 610, at which the time periods $T_{ADV}$ and $T_{DWELL}$ are set in the ADV register 34 and the DWELL register 36, and then the routine is ended. In case it is not decided at the Step 606 that FLG 1=1, the angle ignition control is previously accomplished. As a result, the processings to be accomplished at Steps 607 and later are for those when the POS signals 1b are deficient during the control with the angle ignition signal so that the control is shifted to the time ignition control. Since the ADV counter value fails to reach the ADV register value, the High value is inputted to the reset terminal of the flip-flop 39 at the Step 607. As a result, the ignition coil is actually sparked. At Step 608, the inputs of the ADV counter 33 and the DWELL counter 35 are switched to the clock pulses. At Step 610, the time periods $T_{ADV}$ and $T_{DWELL}$ are set in the ADV register 34 and the DWELL register 36, thus ending the routine. Incidentally, FIG. 7 shows a timing chart.

In the engine control system having the electronic distribution circuit, moreover, the number of the POS signals while the REF signals are being generated is counted, as described above, to output the reference cylinder signal to determine the cylinder. In case, however, the POS signals are deficient during the generation of the REF signals, the signal of the reference cylinder cannot be generated. In the present invention, therefore, the backup is accomplished by generating an auxiliary cylinder signal.

The REF signals are made to have different pulse widths for individual cylinders. As mentioned above, for example, the pulse numbers of the POS signals for the first to sixth cylinders are 24, 20, 16, 12, 8, 4 pulses, respectively. This makes it possible to decide the cylinder if the time widths of the preceding REF signal and the present REF signal are compared. Moreover, the maximum comparison value, i.e., the highest ratio between the first and sixth cylinders is 6, a single cylinder can be determined easily and reliably by determining whether or not the time comparison of the pulse width is higher than a predetermined value.

Figure 8:
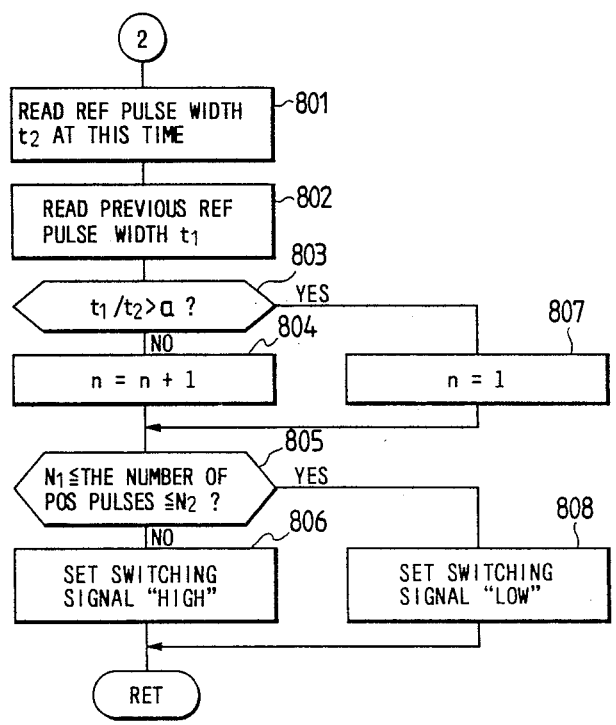
FIG. 8 is a flow chart for the backup of the cylinder signal.

FIG. 8 is a flow chart showing the backup of the cylinder decision. At Step 801, the time width $t_2$ corresponding to the pulse width of the present REF signal is read in. At Step 802, the time width $t_1$ corresponding to the pulse width of the preceding REF signal is read in. In case it is intended at Step 803 to judge, by comparing the time width $t_1$ and the time width $t_2$, whether or not the comparison value, for example, $t_1/t_2$ is a prescribed value, that is, it is representative of the first cylinder, it is sufficient to determine whether or not the comparison value is 6, i.e., the ratio of the POS signal number 24 of the first cylinder to the POS signal number 4 of the sixth cylinder. In case it is decided YES at the Step 803, namely, in case a predetermined cylinder, e.g., the first cylinder comes, the count value n is set to the initial value 1 at Step 807. In case NO at the Step 803, namely, in case the predetermined cylinder fails to come, the value is counted up at Step 804. At the Steps 804 and 807, an auxiliary cylinder signal 3b is obtained on the basis of a set value and added to a cylinder signal switching circuit 23. At Step 805, it is determined whether or not the POS signals are deficient. If YES, the switching signal 3c for switching the cylinder signal is raised at Step 806 to the High level so that the output of the cylinder signal switching circuit 23 is to be the auxiliary cylinder signal. If decided at the Step 805 that the POS signals are not deficient, the switching signal 3c is dropped at Step 808 to the Low lever, so that the output of the cylinder signal switching circuit 23 is to be the reference cylinder signal 22a.

Thus, the cylinder discrimination can be effected even if the POS signal 1b is deficient.

A second embodiment of the present invention will be described referring to FIGS. 9 to 13.

Figure 9:
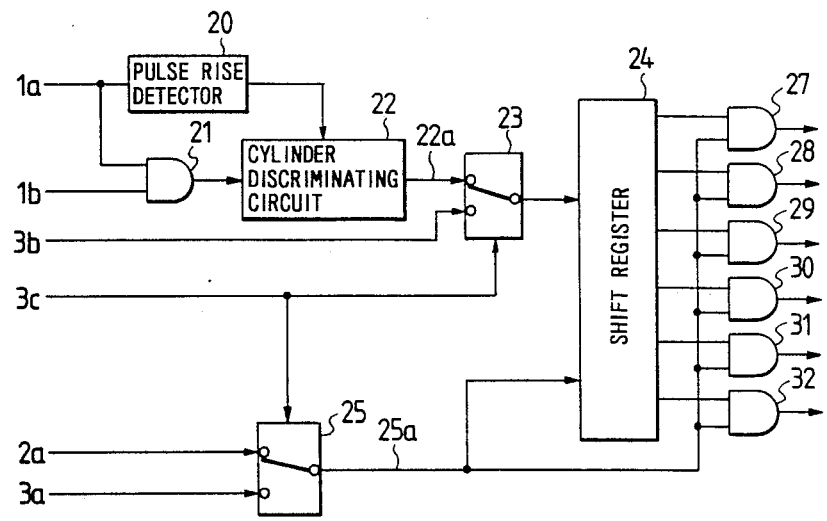
FIG. 9 is a diagram showing another embodiment (second embodiment) of an internal structure of an electronic distribution circuit according to the present invention.

FIG. 9 is a diagram showing the structure of the electronic distribution device of the second embodiment. The same portions as those of FIG. 2 are designated at the same reference characters.

In FIG. 9, the angle ignition signal 2a and the time ignition signal 3a are selected by an ignition signal switching device 25 by switching signal 3c which is described later and fed to the AND gates 27 to 32. Further, the reference cylinder signal 22a and the auxiliary cylinder signal 3b also are switched by the switching signal 3c and the selected signal is fed to the shift register 24.

Figure 13:
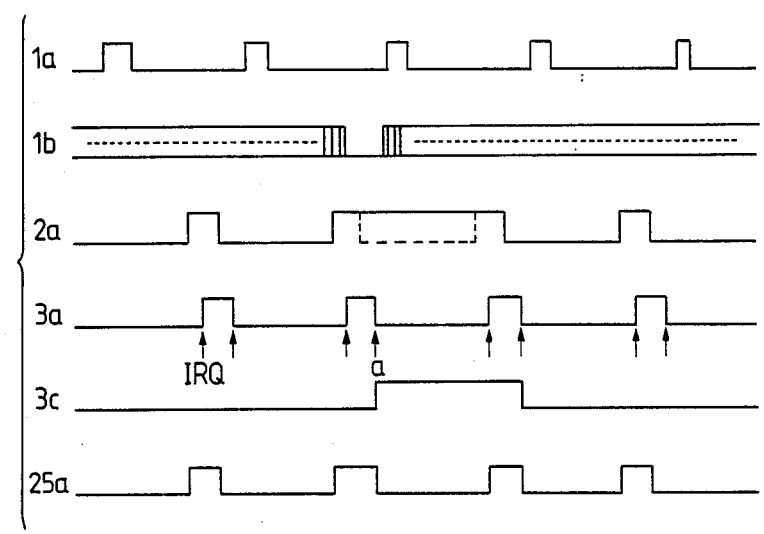
FIG. 13 is a timing chart showing the operations of the second embodiment.

The fundamental concept of the second embodiment will be described with reference to the timing chart of FIG. 13. The angle ignition signal based upon the REF signal 1a and the POS signal 1b is designated as 2a. Here, in case the time ignition signal 3a is so outputted on the basis of the period T of the REF signals 1a that its rise and break never fail to be delayed more than the rise and break of the angle ignition signal 2a, it is decided that the angle ignition signal 2a is normally rising if it is high when the time ignition signal 3a rises at IRQ. If, on the contrary, the angle ignition signal 2a is low when the time ignition signal 3a breaks as indicated by arrows, it is decided that the time ignition signal 2a is normally breaks. If, therefore, the angle ignition signal 2a is switched, on the basis of that decision, to the time ignition signal 3a when the POS signals 1b are deficient, the ignition timing control can be backed up.

The switching of the angle ignition signal 2a to the time ignition signal 3a is effected according to the switching signal 3c which is made high when the angle ignition signal 2a is high at break of the time ignition signal 3a as shown by an arrow "a" and is made low when the angle ignition signal 2a is low at break of the time ignition signal 3c.

Next, generation of the time ignition signal 3a will be described referring to FIG. 11.

FIG. 11 is a flow chart for outputting the time ignition signal 3a. At Step 1101, the REF period T is read in. At Step 1102, the advance angle value ADV is converted into a time in accordance with the period of the REF signal and is added by $T=_{ADV}$ to calculated the advance angle value $T_{ADV}$ of the time ignition signal. Likewise, the power supply value DWELL is converted into a time at Step 1103 to be $T_{DWELL}$ according to the following equation:

$$T_{DWELL} = T/A \times DWELL - T_{DWELL=}.$$

Figure 10:
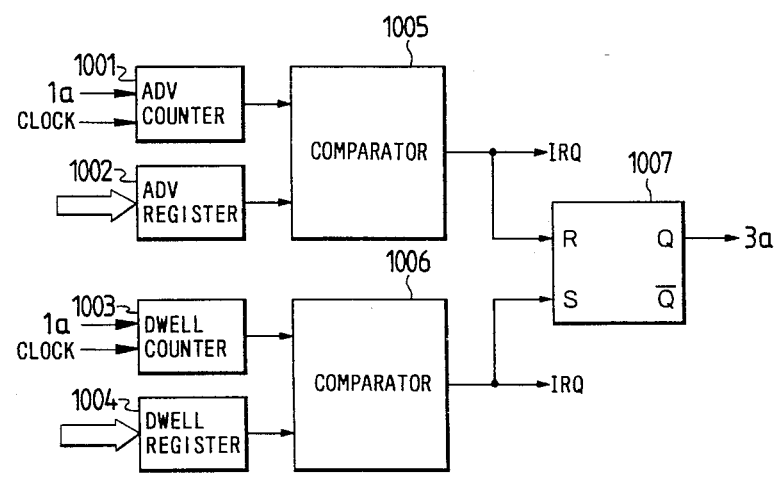
FIG. 10 is a diagram showing the second embodiment of the internal structure of the I/0 according to the present invention.

The value $T_{DWELL=}$ is so set that the time period $T_{DWELL}$ from the generation of the REF signal is delayed from the break of the angle ignition signal. At Step 1104, the values $T_{ADV}$ and $T_{DWELL}$ are set in an ADV register 1002 an a DWELL register 1004 of FIG. 10. A construction shown in the block diagram of FIG. 10 is different from those in FIG. 3 and provided in I/0 2, to produce a time ignition signal 3a based on the REF signal 1a, clock pulse and the above-mentioned $T_{ADV}$ and $T_{DWELL}$.

The construction comprises a ADV counter 1001 for counting the number of clock pulses between the REF signals 1a, the ADV register 1002 for storing the above-mentioned $T_{ADV}$, a comparator 1005 which generate a signal when the counter value reaches to the $T_{ADV}$ and makes a reset input of a flip-flop 1007 high, a DWELL counter 1003 which also count clock pulse between the REF signals 1a, the DWELL register 1004 for storing the above-mentioned $T_{DWELL}$, a comparator for comparing the counter value and the registered $T_{DWELL}$ and outputting a signal making a set output of the flip-flop 1007 high. The operations are similar to those of FIG. 3, and their description will be omitted.

The flow chart shown in FIG. 12 is started at each rise and break of the time ignition signal 3a. At Step 1201, it is determined whether or not the time ignition signal 3a is at rise or break. If determined at rise at the Step 1201, it is determined whether or not the FLG 2 indicates 1, that is, the angle ignition signal is low. If FLG 2=1, namely, if the angle ignition signal is high irrespective of the break of the time ignition signal, it is determined that the POS signals are deficient, and the switching signal 3c is raised to the high level so that the angle ignition signal 2a is switched to the time ignition signal 3a. If it is not determined at Step 1202 that FLG 2=1, it is determined at Step 1203 whether or not the angle ignition signal 2a is high. If High, FLG 2=0 at Step 1207, and it is determined at Step 1208 that the POS signals are not deficient to set the switching signal 3c low. If it is determined at the Step 1203 that the angle ignition signal 2c is not high, FLG 2=1 is set at Step 1204, and the switching signal 3c is set high at Step 1205.

If, on the contrary, it is determined at the Step 1201 that the time ignition signal 2a is rising, it is determined at Step 1206 whether or not the angle ignition signal 1206 is low. In the case of low, the switching signal 3c is set low at the Step 1208, and otherwise the switching signal 3c is set high, thus ending the flow chart.

As has been described in detail hereinbefore, according to the present invention, even if the POS signal output of the crank angle sensor 1 is made temporarily deficient by an insufficient contact of the connectors, there can be attained an effect that a proper ignition timing control can be accomplished to avoid fluctuations in the rotations of the engine and engine stall.

What is claimed is:

1. An engine control system in which ignition timing control is effected on the basis of angle ignition signals, said system comprising:
    reference signal generating means for generating reference signals each outputted at each first predetermined rotational angle interval of the engine, said reference signals each having a constant angular relation to a top dead center of each cylinder of the engine;
    position signal generating means for generating position signals for controlling the ignition timing, said position signals each having a second predetermined rotational angle interval shorter than said first predetermined rotational angle interval;
    angle ignition signal generating means for generating an angle ignition signal on the basis of said reference signal and said position signal;
    clock signal generating means for generating clock signals with a constant time period;
    time ignition signal generating means for generating a time ignition signal on the basis of said reference signal and said clock signal;
    abnormality detecting means for detecting abnormality in the position signals; and
    output selecting means for selecting and outputting the angle ignition signals in a normal state and the time ignition signals when the abnormality in the position signals is detected, whereby the ignition timing is controlled in both normal and abnormal states of the position signal.

2. An engine control system according to claim 1, wherein said abnormality detecting means includes:
    counting means for counting the number of said position signals between said reference signals; and
    comparing means for comparing the counted value of said counting means with a predetermined value, whereby the abnormality detection is accomplished on the basis of the compared result of said comparing means.

3. An engine control system according to claim 1, wherein said abnormality detecting means detects the state of said time ignition signal by the rise and break of said time ignition signal outputted with a slight delay.

4. An engine control system according to claim 1, wherein said abnormality detecting means includes rise detecting means for detecting the rise of said time ignition signal so that an abnormality is detected on the basis of said rise and said angle ignition signal.

5. An engine control system according to claim 1, wherein said abnormality detecting means includes break detecting means for detecting the break of said time ignition signal so that an abnormality is detected on the basis of said break and said angle ignition signal.

6. An engine control system wherein ignition timing control for a plurality of cylinders is effected by signals directed to ignition coils, said system comprising:
   reference signal generating means for generating reference signals the number of which corresponds to the number of engine cylinders in two rotations of a crankshaft of the engine, said reference signals each having a constant angular interval therebetween;
   signal generating means for generating periodic pulse signals outputted at a small interval;
   cylinder signal generating means for generating reference cylinder signals on the basis of said reference signal and said periodic pulse signal, said reference cylinder signals specifying said individual cylinders;
   angle ignition signal generating means for generating an angle ignition signal for the ignition timing control, based on said reference signals and said periodic pulse signals;
   time ignition signal generating means for generating an angle ignition signal, based on said reference signal and clock pulses periodically outputted;
   abnormality detecting means for detecting an abnormality of said periodic pulse signal;
   auxiliary cylinder signal generating means for comparing the preceding cylinder signal and the present cylinder signal to generate an auxiliary cylinder signal;
   switching means for outputting said reference cylinder signal in a normal operation and said auxiliary cylinder signal when said abnormality is detected; and
   output selecting means for outputting said angle ignition signal in a normal state and said time ignition signal when said periodic pulse signal is abnormal.

7. An engine control system according to claim 6, wherein said periodic pulse signal is a constant angular interval of rotation of said crankshaft.

8. An engine control system which effects ignition control by ignition signals directed to ignition coils corresponding to respective engine cylinders, said system comprising:
   a crank angle sensor for generating reference position signals outputted for each cylinder of the engine at equal intervals during two rotations of an engine crankshaft and position signals outputted at each minute angle of rotation of the crankshaft,
   angle ignition signal generating means for generating angle ignition signals fed to said ignition coil for ignition timing control, said angle ignition signal generating means including an ADV counter receiving said reference position signals and said position signals or clock pulses for counting said position signals or clock pulses between a reference position signal and the next reference position signal, a ADV register for storing advance angular value corresponding to an angle from a pulse rise of one of said reference position signal to an ignition position, a first comparator for comparing the registered advance angular value and the counted value to generate a reset pulse when the counted value reaches the registered advance angular value, a DWELL counter receiving the reset pulse from the comparator and said position signal or clock pulse for counting said position signal or clock pulse between the reset pulse and the next reset pulse, a DWELL register for storing a dwell angular value corresponding to an angle from the ignition position to power supply starting position, a second comparator for comparing the counted value and the registered dwell angular value to generate a set pulse when the counted value reaches to the registered dwell angular value, and a flip-flop outputting angle ignition signals with said set and reset pulses supplied thereto when said position signals are inputted to said ADV counter and said DWELL counter, and time ignition signals when said clock pulses are fed to said ADV counter and said DWELL counter, and an advance angular value converted to time value and a dwell value converted to time value are fed to said ADV register and said DWELL register;
   abnormality detecting means for detecting abnormality of the position signal by judging whether or not the number of the position signals between the reference position signals is a predetermined number,
   a cylinder signal generating means for generating cylinder signals by which the individual cylinders are discriminated, said signal being generated based on reference position signal and said position signals;
   an auxiliary cylinder signal generating means generating auxiliary cylinder signals, based on a ratio of pulse width of one said reference position signals and to pulse width of a reference position signal outputted right after the reference position signal,
   cylinder signal switching means for switching said reference cylinder signal to said auxiliary reference signal when the abnormality in the position signal is detected,
   ignition signal distributing means for distributing ignition signals to the individual ignition coils based on one of said angle ignition signal and said time ignition signal and one of said reference cylinder signal and said auxiliary cylinder signal.

* * * * *